United States Patent [19]

Schimmel et al.

[11] Patent Number: 5,229,458
[45] Date of Patent: Jul. 20, 1993

[54] POWDER COATING OF PARTICULATE THERMOSET RESIN AND OLEFIN-MALEIC ANHYDRIDE COPOLYMER

[75] Inventors: Karl F. Schimmel, Verona; Paul H. Pettit, Jr., Allison Park, both of Pa.

[73] Assignee: PPG Industries, Inc., Pittsburgh, Pa.

[21] Appl. No.: 778,770

[22] Filed: Oct. 21, 1991

Related U.S. Application Data

[63] Continuation of Ser. No. 373,634, Jun. 29, 1989, abandoned, which is a continuation of Ser. No. 87,498, Aug. 19, 1987, abandoned.

[51] Int. Cl.$^5$ ............ C08L 33/08; C08L 63/02; C08L 63/04; C08L 67/02
[52] U.S. Cl. ............ 525/108; 525/111; 525/113; 525/114; 525/117; 525/176; 525/183; 525/194; 525/207
[58] Field of Search ............ 525/113, 117, 207, 168, 525/170, 108, 111, 114, 176, 183, 194

[56] References Cited

U.S. PATENT DOCUMENTS

| | | | |
|---|---|---|---|
| 3,497,574 | 2/1970 | Press | 525/207 |
| 3,637,579 | 1/1972 | Baric, Jr. et al. | 525/117 |
| 3,880,811 | 4/1975 | Kaupp | 525/113 |
| 3,966,672 | 6/1976 | Gaylord | 525/207 |
| 4,073,827 | 2/1978 | Okasaka et al. | 525/176 |
| 4,097,449 | 6/1978 | Heilman et al. | 525/117 |
| 4,192,930 | 3/1980 | Beck et al. | 525/207 |
| 4,211,851 | 7/1980 | Sasayama | 525/207 |
| 4,240,916 | 12/1980 | Rossi | 252/56 D |
| 4,358,573 | 11/1982 | Verbrugge | 526/272 |
| 4,584,348 | 4/1986 | Nagano | 525/207 |
| 4,612,155 | 9/1986 | Wong et al. | 525/207 |
| 4,623,581 | 11/1986 | Hert | 525/207 |
| 4,675,210 | 6/1987 | Clayton et al. | 427/208.2 |
| 4,857,595 | 8/1989 | Kazmierzak et al. | 525/207 |

FOREIGN PATENT DOCUMENTS

| | | | |
|---|---|---|---|
| 55-78038 | 6/1980 | Japan | 525/207 |
| 56-103237 | 8/1981 | Japan | 525/207 |
| 58-211303 | 12/1983 | Japan | 525/207 |
| 86-06394 | 11/1986 | PCT Int'l Appl. | 525/207 |
| 86-06395 | 11/1986 | PCT Int'l Appl. | 525/207 |

*Primary Examiner*—Robert E. Sellers
*Attorney, Agent, or Firm*—Daniel J. Long; Dennis G. Millman

[57] ABSTRACT

Powder coating compositions are provided including a thermosetting or thermoplastic particulate resinous material and as a flow modifier, a copolymer of maleic anhydride or a substituted maleic anhydride and a copolymerizable material selected from among cycloalkenes and aliphatic olefins, with said copolymer optionally chemically modified with a primary amine or alcohol. Such flow modifiers can provide the cured coating with recoat adhesion and crater control.

9 Claims, No Drawings

POWDER COATING OF PARTICULATE THERMOSET RESIN AND OLEFIN-MALEIC ANHYDRIDE COPOLYMER

This application is a continuation of application Ser. No. 07/373,634, filed Jun. 29, 1989, which is a continuation of application Ser. No. 07/087,498, filed Aug. 19, 1987, both now abandoned.

FIELD OF THE INVENTION

The present invention relates to powder coatings including a novel flow modifier.

BACKGROUND OF THE INVENTION

Typical powder coatings include a flow modifier or flow control agent to control cratering and reduce orange-peel characteristics. Flow modifiers help control interfacial tension and surface tension of the powder coating during baking operations. Common flow modifiers include low glass transition temperature acrylics such as polylauryl acrylate, polybutyl acrylate, poly(2-ethylhexyl)acrylate, poly(ethylacrylate-2-ethylhexylacrylate), polylauryl methacrylate and the like. Fluorinated polymers, such as the esters of polyethylene glycol or polypropylene glycol, and fluorinated fatty acids are also used as flow modifiers.

Powder coatings are widely used in a variety of industrial applications. Some of these applications require recoatability, i.e., good recoat adhesion between the cured powder coating and a subsequent coating layer, so that minor imperfections or minor damages that may occur during shipment and transfer of industrial parts can be corrected. Unfortunately, powder coatings containing the common flow modifiers have been found to have poor recoat adhesion.

SUMMARY OF THE INVENTION

In accordance with the present invention, a powder coating composition comprising from about 95 to about 99.99 percent by weight of a particulate resinous material and from about 0.01 to about 5 percent by weight of a flow modifier, which is a copolymer of (1) maleic anhydride or substituted maleic anhydride of the formula:

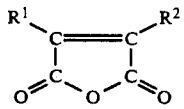

wherein $R^1$ and $R^2$ are each independently selected from the group consisting of hydrogen, lower alkyl groups containing from 1 to 4 carbon atoms or a halogen and (2) a copolymerizable material selected from the group consisting of a cycloalkene or an aliphatic olefin of the formula:

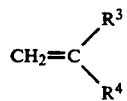

wherein $R^3$ and $R^4$ are each independently selected from the group consisting of hydrogen, alkyl groups having from 1 to about 12 carbon atoms, or cycloparaffin groups having from 5 to about 7 carbon atoms with the proviso that the total number of carbon atoms in $R^3$ and $R^4$ is from 3 to 14, or $R^3$ and $R^4$ combine to form a cycloparaffin having from 5 to about 7 carbon atoms, said copolymer chemically modified by from 0 to 100 mole percent of a primary amine, an alcohol or a combination thereof based on moles of (1) in said copolymer.

The powder coating compositions of this invention provide the benefits of recoatability as well as crater control of the coating.

DETAILED DESCRIPTION OF THE INVENTION

The powder coating compositions of the present invention include an intimate particulate mixture of several materials. The powder coating compositions include a particulate resinous material of a thermosetting or a thermoplastic nature and the flow modifier of this invention, i.e., a copolymer of maleic anhydride or substituted maleic anhydride of the formula:

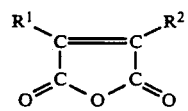

wherein $R^1$ and $R^2$ are each independently selected from the group consisting of hydrogen, lower alkyl groups containing from 1 to 4 carbon atoms or a halogen, and a copolymerizable material selected from the group consisting of a cycloalkene or an aliphatic olefin of the formula:

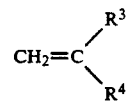

wherein $R^3$ and $R^4$ are each independently selected from the group of hydrogen, alkyl groups having from 1 to about 12 carbon atoms, or cycloparaffin groups having from 5 to about 7 carbon atoms with the proviso that the total number of carbon atoms in $R^3$ and $R^4$ is from 3 to 14, or $R^3$ and $R^4$ combined to form a cycloparaffin having from 5 to about 7 carbon atoms, the copolymer chemically modified by from 0 to 100 mole percent of a primary amine, an alcohol or combination thereof based on moles of maleic anhydride or substituted maleic anhydride in the copolymer.

The particulate resinous material can be, for example, (a) an epoxy resin and a suitable curing agent for the epoxy resin, for example, a carboxylic functional acrylic resin, dicyandiamide, a polyanhydride or a carboxylic functional polyester resin, (b) a carboxylic functional acrylic resin and a suitable curing agent for the acrylic resin, for example, triglycidyl isocyanurate or a hydroxyalkylamide, or (c) a carboxylic functional polyester resin and a suitable curing agent for the polyester resin, for example, a blocked isocyanate curing agent or a hydroxylalkylamide. The particulate resinous material may also be a thermoplastic particulate mixture of, e.g., polyethylene, polypropylene, a polyamide or a polyester. Thermosetting resinous particulate materials are preferred.

The flow modifiers of this invention are copolymers of maleic anhydride or a substituted maleic anhydride and a copolymerizable material such as a cycloalkene or an aliphatic olefin. The maleic anhydride is of the formula:

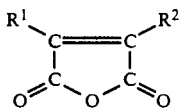

wherein $R^1$ and $R^2$ are each independently selected from the group consisting of hydrogen, lower alkyl groups containing from 1 to 4 carbon atoms or a halogen. Examples of such maleic anhydrides include maleic anhydride, chloromaleic anhydride, bromomaleic anhydride, methyl maleic anhydride (citracronic anhydride) ethylmaleic anhydride, dichloromaleic anhydride, dimethyl maleic anhydride and the like. Maleic anhydride, i.e., wherein $R^1$ and $R^2$ are each hydrogen, is preferred.

The materials which can be copolymerized with the maleic anhydride or substituted maleic anhydride include cycloalkenes and aliphatic olefins. Suitable cycloalkenes may generally include from 6 to about 12 carbon atoms, preferably from 6 to about 10 carbon atoms and include such materials as cyclohexene, cycloheptane, cyclooctene, and cyclononene. The copolymerizable aliphatic olefins are of the general formula:

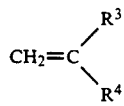

wherein $R^3$ and $R^4$ are each independently selected from the group of hydrogen, alkyl groups having from 1 to 12 carbon atoms, or cycloparaffin groups having from 5 to 7 carbon atoms with the proviso that the total number of carbon atoms in $R^3$ and $R^4$ is from 3 to 14. $R^3$ and $R^4$ may also combine to form a cycloparaffin having from 5 to 7 carbon atoms. Among the aliphatic olefins contemplated in forming the copolymer are, e.g., 1-pentene, 1-hexene, 1-heptene, 1-octene, 1-decene, 1-dodecene, 2-methyl-1-butene, 2-ethyl-1-butene, 2-ethyl-1-pentene, 2-methyl-1-pentene and 2-ethyl-1-hexene. The alphatic olefin may also be materials such as methylene-cyclohexane, i.e., a material wherein $R^3$ and $R^4$ combine to form a cyclohexane ring. Similar copolymerizable materials include, e.g., 1-ethylene-cyclohexane or 3-isopropenyl-1-methylcyclohexane. The aliphatic olefins may further contain a terminal cyano group. The preferred flow modifier is a copolymer of maleic anhydride and an alpha olefin having from about 6 to 10 carbon atoms, e.g., 1-hexene, 1-heptene, 1-octene, 1-nonene, or 1-decene.

The copolymer can be considered an essentially alternating copolymer of the two reactants. Theoretically, one mole of the maleic anhydride or substituted maleic anhydride is added to one mole of the copolymerizable material to obtain the copolymer. However, a molar excess of the copolymerizable material over the maleic anhydride is preferably employed. The reaction is carried out by heating the reactants together, preferably in the presence of an organic solvent and in the presence of a free radical initiator, e.g., an organic peroxide such as tertiary amyl peroxyacetate, tertiary butyl perbenzoate and the like, or an azo compound such as azobisisobutyronitrile and the like at a temperature generally up to the reflux of the copolymericable material, generally temperatures from about 30° Centrigrade (C.) to about 220° C., preferably from about 80° C. to 180° C. for a time sufficient to complete the copolymerization, generally, a period of time varying between 1 to 24 hours, preferably 1 to 3 hours. The organic peroxide free radical initiators are preferred.

The copolymers used as the flow modifiers generally have a number average molecular weight of from about 1,000 to about 20,000, preferably from about 3,000 to about 10,000, and more preferably from 3,000 to 6,000. The number average molecular weight of the copolymers can be determined by gel permeation chromatography (GPC) using a polystyrene standard. By such method, it is not the actual molecular weight which was measured but an indication of the molecular weight as compared to polystyrene. The values which were obtained are commonly referred to as polystyrene numbers, however, for the purposes of this application, they are referred to as molecular weights. Molecular weights (number average) less than 1,000 are undesirable as the copolymer loses surface activity, i.e., loss of flow control properties, whereas molecular weights greater than about 10,000 are less desirable and greater than about 20,000 are undesirable because of detrimental flow properties due to high viscosity.

The flow modifying copolymer can be chemically modified by from 0 to 100 mole percent of a primary amine, an alcohol or combinations thereof, based on moles of the anhydride functional groups in the copolymer. Chemical modification with an alcohol forms the partial ester or half ester derivatives, while chemical modification with a primary amine forms the imide. Among the alcohols which can be used are alkanols, preferably alkanols containing from 1 to about 10 carbon atoms such as methanol, ethanol, propanols, butanols, pentanols, hexanols, heptanols, octanols and the like. More preferably, the alkanol is methanol, ethanol, butanol, or 2-ethylhexanol. Aryl alkanols, such as benzyl alcohol, phenethyl alcohol and phenyl propyl alcohol, alkyl glycols, such as, ethylene glycol or propylene glycol, and substituted alkyl glycols, such as, the monoethylether of ethylene glycol, monobutylether of ethylene glycol, and monohexylether of ethylene glycol can also be suitable alcohols to form the half esters of the anhydride groups. The alcohols may also be a tertiary amine having at least one alkanol radical such as 2-dimethylaminoethanol, 1-diemthylaminomethylpropanol, 2-diethylaminoethanol and the like, or a diglycol amine, such as dimethyl or diethyl (amino ethoxy)ethanol. Chemical modification, i.e., esterification, by an alcohol can be accomplished by heating the copolymer and the alcohol together at a temperature of 100° C. to 150° C., optionally using a catalyst, such as sodium methoxide, to expedite the anhydride ring opening. The copolymer can also be chemically modified with primary amines, such as butylamine, isobutylamine, propylamine, isopropylamine, ethylamine, methylamine and pentylamine, aliphatic polyamines, such as N,N-dimethylaminopropylamine, N,N-dimethylaminoethylamine, N,N-diethylaminopropylamine, N,N-diethylaminoethylamine and the like, or primary aminoalcohols such as 2-aminoethanol, 3-aminopropanol and the like. Primary amines, such as aliphatic polyamines, e.g., N,N-dimethylaminopropylamine, yield an imide-modified anhydride with pendent tertiary amino groups, which may act as a catalyst for epoxy reactions, and increase the crosslink density and resistance properties of the cured coating. Primary aminoalcohols can yield an imide-modified anhydride with pendent alcohol functionality.

The powder coating compositions of this invention generally contain from about 95 to 99.9 percent by weight of the particulate thermoplastic or thermosetting resinous material and from about 0.01 to about 5 percent by weight of the flow modifier, i.e., the copolymer. Preferably, the copolymer will be included in the powder coating compositions from about 0.1 to about 3 percent by weight, more preferably, from about 0.5 to about 2 percent by weight on the basis of the total weight of particulate resinous material and flow modifier. The benefits of powder coating compositions with the flow modifiers of this invention, that is, the copolymer of a maleic anhydride or substituted maleic anhydride and the copolymerizable material include excellent recoatability and excellent crater control. Additionally, the powder coating compositions including the flow modifiers of this invention have excellent adhesion in automotive applications to electrodeposited primer coatings, e.g., a cathodic electrodeposition primer composition such as UNIPRIME ® 3150 primer available from PPG Industries, Inc., and topcoats, such as polyester, or acrylic based coatings cured with melamine and the like. Further, the powder coating compositions including the present flow modifiers can be applied to both cured and uncured, i.e., wet, electrodeposited primer coatings without resultant cratering upon baking in either the area of direct coating application or in the area receiving any overspray of powder during application.

Powder coating compositions of this invention can also include other materials such as catalysts, pigments, fillets, light stabilizers, and antioxidants. Further, the compositions can include antipopping agents and powder flow additives. For example, a pigment can be included in the coating composition in amounts from about 1 to about 50 percent by weight based on the total weight of the composition in order to give a suitable color to the resultant coating. Suitable pigments for coating compositions include, e.g., basic lead silica chromate, titanium dioxide, ultramarine blue, phthalocyanine blue, phthalocyanine green, carbon black, black from oxide, chromium green oxide, ferrite yellow, and quindo red.

The powder coating compositions utilized in accordance with the present invention can include a small percentage of a catalyst in order to increase the crosslinking rate of such coating compositions. Suitable catalysts include quaternary ammonium salts, quaternary phosphonium salts, phosphines, imidazoles and metal salts. The catalyst, when used, is preferably present in the composition in amounts between 0 and 5 percent by weight, more preferably from 0.2 to 2 percent by weight based on the total weight of coating composition. Exemplary catalyst include tetrabutylammonium chloride, tetrabutylammonium bromide, tetrabutylammonium iodide, ethyltriphenyl phosphonium acetate, ethyltriphenyl phosphonium iodide, triphenyl phosphite, 2-methyl imidazole and dibutyltin dilaurate.

Antipopping agents can be added to an outer coating composition to allow any volatile material present to escape from the film during baking. Benzoin is a commonly preferred antipopping agent and, when used, is generally present in amounts from about 0.5 to 3.0 percent by weight based on a total weight of the powder composition.

In addition, a powder coating composition may include fumed silica or the like as a powder flow additive to reduce caking of the powder during storage. An example of fumed silica is sold by Cabot Corporation under the trademark CAB-O-SIL ®. The powder flow additive is present in amounts ranging from about 0.1 to about 1.0 percent by weight based on the total weight of the powder coating composition. Generally, the powder flow additive is added to the particulate powder coating composition after preparation of the particulate mixture.

Application of the powder coating compositions can be electrostatic spraying or by the use of the fluidized bed. Electrostatic spraying is the preferred method. The powder coating compositions can be applied in a single sweep or in several passes to provide a film thickness after cure of about 0.5 to 5.0 mils. Preferably, the thickness of the cured coating is from about 1.2 to 4.0 mils, more preferably, from about 1.4 to 3.0 mils to provide a high-quality finish at a reasonable cost.

The substrate can optionally be preheated prior to application of the powder composition to provide a more uniform powder deposition. After application of the powder coating composition, the powder-coated substrate is baked typically at 250° F. to 400° F. (120° C. to 204° C.) from about 1 minute to 60 minutes, preferably at 350° F. for about 5 to 30 minutes.

Thermosetting powder coating compositions are prepared by melt blending the ingredients of the coating compositions. This can be accomplished by first blending the ingredients in a high-shear mixer, such as a planetary mixer, and then melt blending in an extruder from about 80° C. to a bout 130° C. The extrudate is then cooled and pulverized into a particulate blend. Such a particulate mixture can then be applied directly to a substrate of, for example, a metal such as steel or aluminum, glass, plastic, or a fiber-reinforced plastic. Preferably, the particulate mixture is applied to a substrate of a metal such as steel or aluminum.

The present invention is more particularly described in the following examples, which are illustrative only since modifications and variations will be apparent to those skilled in the art. All quantities, percentages and ratios are on a weight basis unless otherwise indicated.

Testing Procedures

Recoat adhesion was determined by applying under identical procedures a second layer of a powder coating composition onto a cured first layer of the same powder coating composition. A cross-hatching pattern was cut in the coating with a razor blade. Adhesion tape was then applied over the cross-hatching pattern, lifted off and recoat adhesion or failure observed.

Detergent resistance was determined by soaking a coated substrate having a scribed cross-hatching pattern, for 250 hours in a detergent bath containing 20 gallons of water, 404 grams(g) of sodium pyrophosphate, 88.7 g of sodium alkylarylsulfonate available as Fisher S-198 from Fisher Scientific Company, 31.8 g of sodium metasilicate, 86 g of anhydrous sodium sulfate and 4.6 g of anhydrous sodium carbonate. The detergent bath was held at 170° F.

Solvent resistance was determined by a method referred to as double-rubs, i.e., a cloth saturated with the solvent is rubbed back and forth (double-rubs) across a coating surface. Coatings which can undergo at least 10 double-rubs with, for example, methyl ethyl ketone, without softening or removing the coating from the substrate are rated "good".

Pencil hardness was determined by taking pencils of increasing hardness (from F to 4H) and attempting to etch a scribe mark in the coating. The softest pencil which will etch the coating is reported as the pencil hardness for the film.

Impact resistance was measured with a Gardner Impact Tester. The coated panels were subjected to increasing levels of impact until the coating cracked. Panels were impacted on the coated side, i.e., direct impact, and the results are reported in inch-pounds.

The following examples show preparation of various ingredients utilized in the powder coating compositions. Examples A–C show the preparation of various copolymers of maleic anhydride and copolymerizable materials. Examples D–H show the preparation of various acrylics, epoxies, and hydroxyl alkylamides.

EXAMPLE A

A reaction vessel fitted with a condenser, thermometer, nitrogen sparging inlet and agitator was charged with 3024 grams (27 moles) of 1-octene. As the 1-octene was heated at a reflux temperature of 120° C., a first mixture of 182 grams (g) of tertiary-amyl peroxyacetate (60 percent by weight of the tertiary-amyl peroxyacetate in 40 percent by weight mineral spirits, available as LUPERSOL 555-M60 from Pennwalt Corp.) and 825 g butyl acetate was added over a period of three hours. Beginning a half hour after the start of the first addition, a second mixture of 1323 g (13.5 moles) of maleic anhydride and 3407 g of butyl acetate was added over a period of two hours. After completion of the additions, heating at reflux was continued for one hour. Thereafter, solvent was removed by distillation with a total distillate of 5453 g removed. The remaining product had a number average molecular weight of about 2,220, a peak molecular weight of about 5,600, and a weight average molecular weight of about 5,910. The recovered solids (2830 g) indicated a 97 percent yield based on an expected stoichiometry of one to one for the reaction between the maleic anhydride and 1-octene.

EXAMPLE B

A reaction vessel fitted with a condenser, thermometer, nitrogen sparging inlet and agitator was charged with 1403 grams (10 moles) of 1-decene. As the 1-decene was heated at a reflux temperature of 145° C., a first mixture of 34 grams (g) of tertiary-amyl peroxyacetate (60 percent by weight in mineral spirits) and 306 g butyl acetate was added over a period of three hours. Beginning a half hour after the start of the first addition, a second mixture of 491 g (5 moles) of maleic anhydride and 1265 g of butyl acetate was added over a period of two hours. After completion of the additions, heating at reflux was continued for one hour. Thereafter, solvent was removed by distillation with a total distillate of 2039 g removed. The remaining product had a number average molecular weight of about 2,660, a peak molecular weight of about 5,740, and a weight average molecular weight of about 5,870. The recovered solids (1378 g) indicated a 99.5 percent yield based on the expected reaction.

EXAMPLE C

A reaction vessel fitted with a condenser, thermometer, nitrogen sparging inlet and agitator was charged 1403 grams (10 moles) of 1-decene. As the 1-decene was heated at a reflux temperature of 145° C., a first mixture of 34 grams (g) of tertiary-amyl peroxyacetate (60 percent by weight in mineral spirits) and 306 g butyl acetate was added over a period of three hours. Beginning a half hour after the start of the first addition, a second mixture of 491 g (5 moles) of maleic anhydride and 3407 g of butyl acetate was added over a period of two hours. After completion of the additions, heating at reflux was continued for one hour. The reaction product was cooled and a third mixture of 26g (0.25 mole) N,N-dimethylaminopropylamine was added at 20° C. This admixture was heated over about 0.5 hours to a temperature of 115° C. Thereafter, solvent was removed by distillation. The remaining product had a number average molecular weight of about 2,290, a peak molecular weight of about 5,530 and a weight average molecular weight of about 6,460. The solids were recovered at a 98.2 percent yield based on the expected reaction.

EXAMPLE D

An acid functional acrylic resin was prepared from the following ingredients:

| Ingredients | Parts by Weight (pounds) |
| --- | --- |
| sebacic acid | 273 |
| di-tertiary butyl peroxide | 123 |
| styrene | 4586 |
| butyl acetate | 869 |
| acrylic acid | 746 |
| 3-mercapto propionic acid | 93 |
| xylene | 3373 |

The bulk of the xylene was charged into a reaction vessel equipped with addition funnels, a condenser, a thermometer, a nitrogen-sparging inlet and an agitator and heated to reflux. An initiator feed including the di-tertiary butyl peroxide in a portion of the xylene and a monomer feed including the styrene, butyl acrylate acrylic acid, and 3-mercapto propanoic acid were added simultaneously over a period of three hours. After the addition of the feeds, a small portion of xylene was used as a rinse, followed by continued reflux for two hours. Subsequently, the sebacic acid was added and the xylene was stripped off under vacuum. The resultant product had an acid value of 112.9, a percent solids as measured at 150° C. for two hours of 99.7 and a number average molecular weight of about 3,030.

EXAMPLE E

An elastomer-modified epoxy was prepared from the following:

| Ingredients | Parts by Weight |
| --- | --- |
| CTBN[1] | 500.0 |
| bisphenol A | 550.0 |
| Epon 828[2] | 1450.0 |
| ethyl triphenyl phosphonium iodide | 0.8 |

[1]Carboxyl-terminated copolymer of butadiene and acrylonitrile having a number average molecular weight of 3,200 and a carboxylic functionality of 1.8, commercially available from B. F. Goodrich Co. as Hycar ® 1300X8.
[2]Diglycidyl ether of bisphenol A having an epoxide equivalent weight of about 188, commercially available from Shell Chemical Company.

The ingredients were mixed in a suitable reaction vessel under a nitrogen atmosphere and the reaction mixture was gradually heated to about 130° C. whereat the reaction mixture exhibited an exotherm. The reaction mixture was occasionally heated for brief periods while the exotherm continued, the mixture eventually reaching a temperature of about 160° C. after about 1½ hours. The mixture was held near this temperature for about one hour. Whereafter, 625 g of methyl isobutyl ketone was added and the mixture slowly cooled. After stripping off the solvent, the resultant elastomer-modified epoxy had an epoxide equivalent weight of about 1055, an acid value of 0.4 and a percent solids as measured at 150° C. for two hours of 99.6.

EXAMPLE F

An acrylic resin was prepared in a similar manner to Example D from the following:

| Ingredients | Parts by Weight (pounds) |
| --- | --- |
| sebacic acid | 16.4 |
| di-tertiary butyl peroxide | 7.3 |
| styrene | 191.7 |
| butylacrylate | 51.0 |
| methacrylic acid | 44.6 |
| methyl methacrylate | 87.8 |
| 3-mercapto propanoic acid | 5.6 |
| xylene | 208.5 |

The resultant product had an acid value of 94.4, a percent solids as measured at 150° C. for two hours of 99.7 and a number average molecular weight of about 4515.

EXAMPLE G

Poly(dodecanedioic anhydride) was prepared from the following ingredients:

| Ingredients | Parts by Weight (grams) |
| --- | --- |
| Dodecanedioic acid | 3105.0 |
| Acetic anhydride | 918.0 |

The ingredients were charged to a reactor and heated under a nitrogen atmosphere to 125° C. Reaction was continued at this temperature for about four hours while vacuum stripping the evolving acetic acid. The temperature was then raised to 150° C. and held at this temperature for about one hour. The vacuum source was then removed and the reaction mixture cooled to room temperature to give a white solid reaction product. The solids content was 97.6 percent as measured at 110° C. for two hours.

EXAMPLE H

A hydroxyalkylamide curing agent, i.e., bis[N,N-di(-beta-hydroxyethyl)]adipamide-glutaramide, was prepared from the following mixture of ingredients:

| Ingredients | Parts by Weight |
| --- | --- |
| 90/10 weight ratio of dimethyl adipate/dimethyl glutarate | 40.7 |
| Diethanolamine | 59.3 |
| Methanolic potassium methoxide | 0.2 (0.05 ml) |

The ingredients were charged to a reaction vessel and heated to about 100° C. at which point the distillation of methanol began. Reaction was continued while distilling methanol until a temperature of about 128° C. was reached. A slight vacuum was applied to the reaction flask and additional methanol was removed. The methanol distillate was added slowly back into the reaction mixture followed by the addition of about 80 parts by weight of acetone. As the reaction mixture cooled, the hydroxyalkylamide precipitated. The precipitate was filtered, washed with acetone and air dried to yield a reaction product melting at 114°–118° C.

Examples 1–3 are thermosetting clear and pigmented powder coating compositions containing the flow modifiers of the invention and comparison powder coating compositions containing a low molecular weight acrylic polymer commercially available as a flow modifier.

EXAMPLE 1

A powder coating composition including a flow modifier of the present invention and a comparative powder coating composition including a commercially available flow modifier were prepared with the following:

| | Parts by Weight (grams) | |
| --- | --- | --- |
| Ingredients | Powder Coating 1 | Comparative Powder Coating 1 |
| Acrylic resin of Example D | 456 | 457 |
| dodecanedioic acid | 20 | 28 |
| epoxy novolac[1] | 87 | 77 |
| epoxy resin[2] | 175 | 216 |
| epoxy resin[3] | 130 | 107 |
| silica filler[4] | 118 | 119 |
| barium sulfate | 170 | 170 |
| carbon black | 43 | 43 |
| benzoin | 6 | 6 |
| zinc pigment[5] | 90 | 84 |
| catalyst blend[6] | 20 | 22 |
| copolymer from Example A | 14 | — |
| MODAFLOW III[7] | — | 10 |

[1] An epoxy cresol novolac resin having an epoxy equivalent weight of about 225, available as ECN-9860 from Ciba-Geigy Corporation.
[2] A polyglycidyl ether of bisphenol A having an epoxy equivalent weight of about 480, available as ARALDITE GT-7071 from Ciba-Geigy Corporation.
[3] A polyglycidyl ether of bisphenol A having an epoxy equivalent weight of about 725, available as ARALDITE GT 9013 from Ciba-Geigy Corporation.
[4] Available as MINUSIL 10 from Pennsylvania Glass Sand Corp.
[5] A zinc hydroxyphosphite complex, available as NALZIN 2 from N. L. Industries, Inc.
[6] A blend of 15 percent by weight ethyl triphenyl phosphonium acetate (ETPPA) in 85 percent by weight acrylic resin of Example D.
[7] Poly(ethylacrylate-2-ethylhexylacrylate) on a silica carrier available from Monsanto Company.

The ingredients were first dry blended in a high-intensity mixer, then melt blended in a Baker Perkins twin screw extruder with a barrel temperature of 110° C. The extrudate was chilled and flaked on a chill roll, ground in a hammermill and sieved through a 100-mesh screen. The resultant powder coating compositions were electrostatically sprayed onto zinc phosphated steel panels using an electrostatic spray gun. The coated panels were then baked at 400° Fahrenheit(F) for 20 minutes. The results of testing for impact resistance, and recoatabilty are given in Table 1.

TABLE 1

| | Impact Resistance (Direct) inch-pounds | Film Thickness (mils) | Recoat Adhesion Failure |
| --- | --- | --- | --- |
| Powder 1 | 50 | 2.1 | 0% |
| Comparative Powder 1 | 60 | 1.7 | 100% |

EXAMPLE 2

A powder coating composition including a flow modifier of the present invention and a comparative powder coating composition with a commercially available flow modifier were prepared from the following:

| Ingredients | Parts by Weight (grams) | |
|---|---|---|
| | Powder Coating 2 | Comparative Powder Coating 2 |
| Epoxy adduct of Example E | 422.0 | 422.0 |
| polyester[1] | 423.2 | 423.2 |
| benzoin | 6.8 | 6.8 |
| barium sulfate | 131.8 | 131.8 |
| titanium dioxide | 68.9 | 68.9 |
| copolymer of Example C | 17.0 | — |
| carbon black | 2.0 | 2.0 |
| MODAFLOW III | — | 11.7 |

[1] A carboxyl-functional polyester having an acid number of 48-58 and a number average molecular weight of about 2,180, available as P2230 polyester from D.S.M. Company.

The above ingredients were formulated into powder coating compositions using the procedure described in Example 1 and electrostatically sprayed onto zinc phosphated steel panels having a cured layer of an electrodeposition coating layer thereon, (UNIPRIME ® electrodeposition coating from PPG Industries, Inc.). The panels were baked at 176° C. for 30 minutes. A panel of each formulation was top coated with an acrylic coating and baked at 130° C. for 30 minutes. The panels with Powder Coating 2 had excellent appearance with slight cratering while the panels with the comparative powder coating had moderate to severe cratering.

EXAMPLE 3

A powder coating composition of the present invention and a comparative powder coating were prepared from the following:

| Ingredients | Parts by Weight (grams) | |
|---|---|---|
| | Powder Coating 3 | Comparative Powder Coating 3 |
| Acrylic preblend mixture[1] | 372 | 372 |
| Epoxy novolac[2] | 95 | 88 |
| Epoxy resin[3] | 217 | 217 |
| Titanium dioxide | 475 | 473 |
| Ultramarine blue | 1.0 | 1.0 |
| Carbon black | 0.1 | 0.1 |
| benzoin | 4.7 | 4.7 |
| Antioxidant[4] | 7.0 | 7.0 |
| Copolymer of Example B | 5.6 | — |
| MODAFLOW III | — | 8.0 |

[1] A preblend mixture including 2100 g of the acrylic resin of Example F, 144 g of ETPPA and 214 g of the polyanhydride of Example G.
[2] As in Example 4.
[3] A polyglycidyl ether of bisphenol A having an epoxy equivalent weight of about 550, available as GT-248 from Ciba-Geigy Corporation.
[4] The octadecyl ester of 3,5-bis(1,1-dimethylethyl)-4-hydroxy benzene propanoic acid, available as IRGANOX 1076 from Ciba-Geigy Corporation.

The above ingredients were formulated into powder coating compositions as described in Example 1 and electrostatically sprayed onto zinc phosphated steel panels. The panels were baked at 176° C. for 20 minutes followed by testing for impact resistance, hardness, detergent resistance and solvent resistance. The testing results are given in Table 2.

TABLE 2

| | Film Thickness | Impact Resistance-Direct | Hardness | Solvent Resistance | Detergent Resistance |
|---|---|---|---|---|---|
| Powder 3 | 3.0 mils | 80 | H | good | good |
| Comparative Powder 3 | 2.8 mils | 40 | HB | poor | blistered |

EXAMPLE 4-5

Powder coating compositions of the present invention and comparative powder coatings were prepared from the following:

| Ingredients | Powder 4 | Comparative Powder 4 | Powder 5 | Comparative Powder 5 |
|---|---|---|---|---|
| polyester[1] | 837 | 843 | 833 | 838 |
| hydroxyalkylamide of Example H | 46 | 46 | — | — |
| triglycidyl isocyanurate | — | — | 50 | 51 |
| benzoin | 7 | 7 | 7 | 7 |
| copolymer as of Example A | 18 | — | 18 | — |
| MODAFLOW III | — | 12 | — | 12 |

[1] A carboxylic-functional polyester, available as URALAC 2400 from D.S.M. Company.

The above ingredients were formulated into powder coating compositions as described in Example 1 and electrostatically sprayed onto phosphated steel panels. The panels were baked for 10 minutes at 350° C. The panels were visually inspected for appearance to compare the flow control of the copolymer additive versus a commercially available flow modifier. Powder 4 gave acceptable visual appearance versus comparative powder 4 and powder 5 gave a visual appearance equal to that of comparative powder 5.

Obviously, many modifications and variations are possible in light of the above teachings. It is to be understood that within the scope of the appended claims, the invention may be practiced otherwise than as specifically described.

What is claimed is:

1. A powder coating composition comprising a mixture of:
   (a) about 95 to about 99.99 percent by weight of a particulate thermosetting resinous material and a curing agent; and
   (b) about 0.01 to about 5 percent by weight of an alternating copolymer, said copolymer being a flow modifier serving to control interfacial tension and surface tension of the powder coating during baking operations and being different from the particulate thermosetting resinous material of element (a), of (i) maleic anhydride or substituted maleic anhydride of the formula:

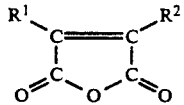

wherein $R^1$ and $R^2$ are each independently selected from the group consisting of hydrogen, lower alkyl groups containing from 1 to 4 carbon atoms or a halogen, and (ii) a copolymerizable material selected from the group consisting of a cycloalkene or an aliphatic olefin of the formula:

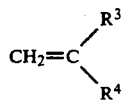

wherein $R^3$ and $R^4$ are each independently selected from the group of hydrogen, alkyl groups having from 1 to about 12 carbon atoms, or cycloparaffin groups having from 5 to about 7 carbon atoms with the proviso that the total number of carbon atoms in $R^3$ and $R^4$ is from 3 to 14, or $R^3$ and $R^4$ combine to form a cycloparaffin having from 5 to about 7 carbon atoms, said copolymer chemically modified by from 0 to 100 mole percent of a primary amine, an alcohol or combination thereof based on moles of (i) in said copolymer.

2. The composition of claim 1 wherein the copolymer consists essentially of (i) maleic anhydride and (ii) an aliphatic olefin of the formula:

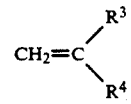

wherein $R^3$ and $R^4$ are each independently selected from the group consisting of hydrogen and an alkyl group having from 1 to about 12 carbon atoms with the proviso that the total number of carbon atoms in $R^3$ and $R^4$ is from 3 to 14.

3. The composition of claim 1 wherein the copolymer consists essentially of (i) maleic anhydride and (ii) an alpha-olefin having from six to ten carbon atoms.

4. The composition of claim 1 wherein the copolymer has a number average molecular weight from about 1,000 to 20,000.

5. The composition of claim 2 wherein the copolymer has a number average molecular weight from about 1,000 to 20,000.

6. The composition of claim 3 wherein the copolymer has a number average molecular weight from about 1,000 to 20,000.

7. The composition of claim 1 wherein the copolymer has a number average molecular weight from about 3,000 to 10,000.

8. The composition of claim 2 wherein the copolymer has a number average molecular weight from about 3,000 to 10,000.

9. The composition of claim 3 wherein the copolymer has a number average molecular weight from about 3,000 to 10,000.

* * * * *